US011075911B2

(12) United States Patent
Canavor et al.

(10) Patent No.: US 11,075,911 B2
(45) Date of Patent: Jul. 27, 2021

(54) GROUP-BASED TREATMENT OF NETWORK ADDRESSES

(71) Applicant: Amazon Technologies, Inc., Seattle, WA (US)

(72) Inventors: Darren Ernest Canavor, Redmond, WA (US); Kenneth Grey Richards, Newcastle, WA (US); William Alexander Strand, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 114 days.

(21) Appl. No.: 16/384,690

(22) Filed: Apr. 15, 2019

(65) Prior Publication Data
US 2019/0268339 A1    Aug. 29, 2019

Related U.S. Application Data

(62) Division of application No. 15/062,003, filed on Mar. 4, 2016, now Pat. No. 10,277,596.

(51) Int. Cl.
*H04L 29/06* (2006.01)
*H04L 29/12* (2006.01)

(52) U.S. Cl.
CPC ............ *H04L 63/10* (2013.01); *H04L 63/02* (2013.01); *H04L 63/1458* (2013.01); *H04L 61/6004* (2013.01); *H04L 61/6068* (2013.01)

(58) Field of Classification Search
CPC ......... H04L 12/26; H04L 12/56; H04L 29/00; H04L 63/02; H04L 63/10; H04L 63/1458; G06F 7/76; G06N 5/02
See application file for complete search history.

(56) References Cited

U.S. PATENT DOCUMENTS

| 6,286,052 | B1 | 9/2001 | McCloghrie |
| 7,072,337 | B1 | 7/2006 | Arutyunov |
| 7,130,626 | B2 | 10/2006 | Bender |
| 7,907,543 | B2* | 3/2011 | Barford ................. H04L 43/026 370/252 |

(Continued)

*Primary Examiner* — Thanhnga B Truong
(74) *Attorney, Agent, or Firm* — Knobbe Martens Olson & Bear LLP

(57) ABSTRACT

Systems, methods, and computer-readable media are described for a network address block treatment server. The network address block treatment server identifies blocks of network addresses, associates them with treatments, and generates compact representations of the network address blocks. Blocks may be identified based on network activity data or on the treatment of individual network addresses, and treatments may be associated with address blocks based on address-level and/or block-level criteria. Treatments may include, for example, denying service requests, throttling, queueing, issuing a challenge-response, or limiting the number or scope of services. The network address block treatment server may review treatments periodically or upon receipt of additional network activity data. The server may implement treatments in connection with firewall or routing services, or may transmit address block representations and associated treatments to network service providers for implementation.

20 Claims, 7 Drawing Sheets

(56) References Cited

U.S. PATENT DOCUMENTS

| | | | |
|---|---|---|---|
| 8,942,235 B1* | 1/2015 | Vinapamula Venkata | ................... H04L 63/0263 370/392 |
| 9,203,806 B2* | 12/2015 | Ahn | ......................... G06N 5/02 |
| 2003/0053441 A1 | 3/2003 | Banerjee | |
| 2005/0027506 A1* | 2/2005 | Kerr | ....................... H04L 45/00 703/27 |
| 2007/0011307 A1* | 1/2007 | Brady, Jr. | ................ H04L 41/06 709/224 |
| 2015/0172252 A1* | 6/2015 | Pandian | ................ H04L 43/045 709/223 |
| 2015/0207905 A1 | 7/2015 | Merchant | |
| 2016/0359888 A1* | 12/2016 | Gupta | ................... H04L 41/046 |

\* cited by examiner

GROUP-BASED TREATMENT OF NETWORK ADDRESSES

CROSS REFERENCE TO RELATED APPLICATION

This application is a divisional of U.S. patent application Ser. No. 15/062,003 entitled GROUP-BASED TREATMENT OF NETWORK ADDRESSES, and filed Mar. 4, 2016, the entirety of which is incorporated herein by reference.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, providers of services to third parties, herein generally referred to as "network service providers," may deliver services to third-party computing devices via a network or networks, and may deliver services to particular network addresses associated with individual computing devices.

Computing devices that engage in certain network activities may deliberately or inadvertently interfere with the delivery of services by network service providers. For example, computing devices may be incorrectly configured to send malformed requests for services, or may be configured to send fraudulent requests, high volumes of requests (e.g., a distributed denial-of-service attack) in an attempt to circumvent security measures, or to send programmatically generated requests. Network service providers may mitigate the effects of these activities by identifying network addresses associated with undesired network activities and applying non-standard treatments to requests from these addresses. A network service provider may blacklist a particular network address, for example, or may provide a reduced level of service. Network service providers may thus conserve bandwidth, processing power, and other computing resources by applying treatments to particular network addresses.

BRIEF DESCRIPTION OF THE DRAWINGS

The foregoing aspects and many of the attendant advantages will become more readily appreciated and understood by reference to the following detailed description, when taken in conjunction with the accompanying drawings, wherein.

DETAILED DESCRIPTION

Figure 1A:
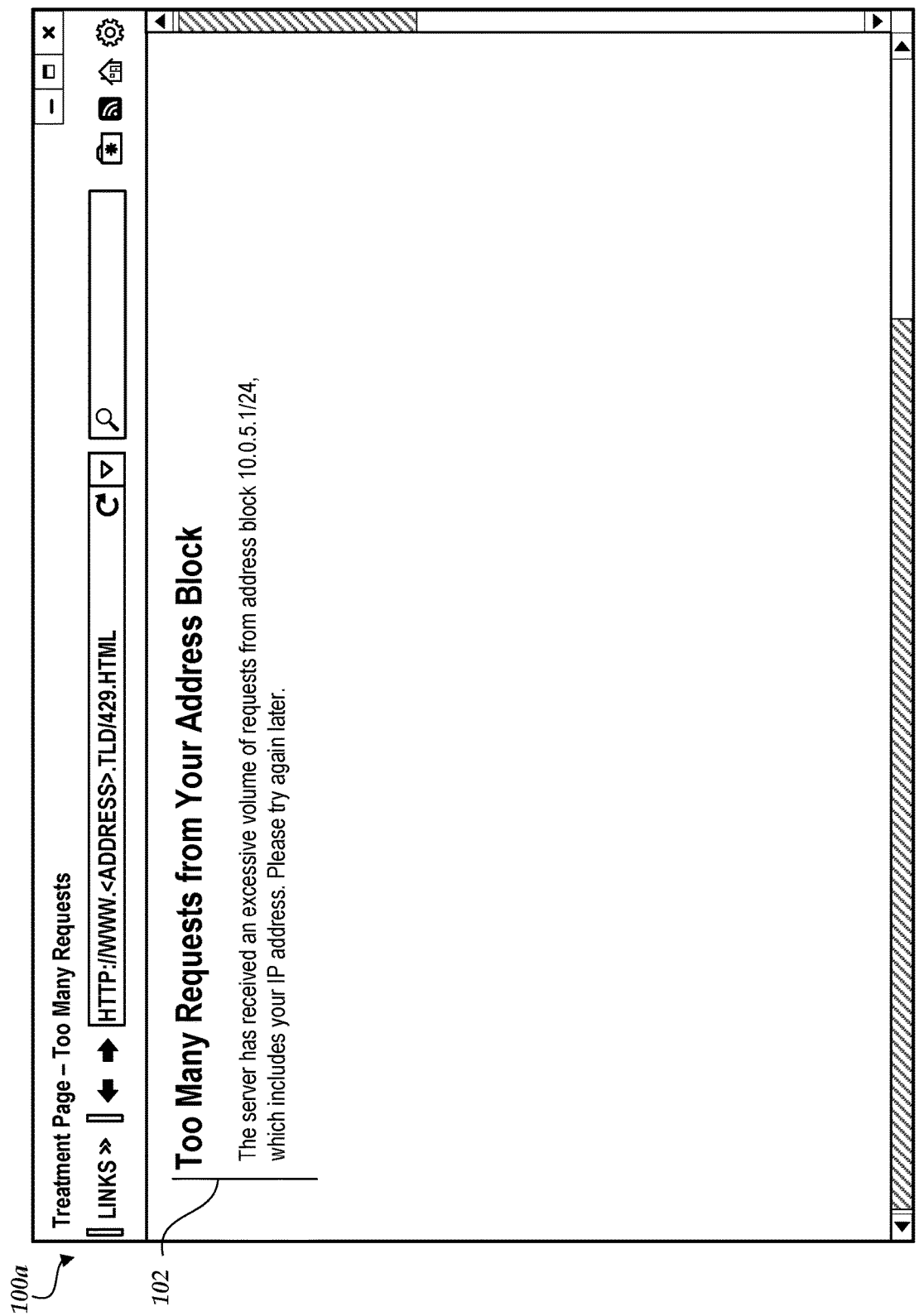
FIGS. 1A and 1B are pictorial diagrams depicting illustrative user interfaces that may be output by a network address block treatment server.

Generally described, aspects of the present disclosure are directed to managing the treatment of network addresses. More specifically, aspects of the present disclosure correspond to systems, methods, and computer-readable media related to providing a network address block treatment service, e.g., a service that enables identifying network addresses that require special treatment, grouping these addresses into identifiable blocks, and managing the treatment of the network address blocks. Illustratively, a network service provider may provide services via a network, such as the Internet, that identifies particular network addresses using a protocol, such as the Internet Protocol version 4 ("IPv4"). An IPv4 address may be expressed as a series of four octets, such as 54.239.25.200 or 172.16.10.229. One skilled in the art will note that aspects of the present disclosure are not limited to any particular network protocol or expression of network addresses.

A network address block treatment server may monitor network activities associated with the network service provider, such as requests to provide services, that originate from various network addresses. By monitoring network activities, the network address block treatment server may identify particular network addresses for which a special treatment is desirable. For example, the network address block treatment server may identify a network address that is generating a high volume of malformed requests. Without special treatment, the network service provider would respond to each malformed request with its standard treatment (e.g., by attempting to parse the request and then displaying an error message or a help page), which would consume a higher amount of resources at the network service provider. A special treatment may mitigate the consumption of resources by, for example, denying requests, throttling requests, queueing requests, redirecting requests, delivering a response that utilizes fewer resources (e.g., a low-bandwidth page), silently dropping requests, reducing the quantity of services made available, reducing the scope of services made available, issuing a challenge-response (e.g., a CAPTCHA or a security question) to verify that a human is generating the requests, or otherwise reducing the consumption of resources at the network service provider.

In some embodiments, the network address block treatment server may identify network addresses for which a preferred treatment is desirable based on external sources rather than network activity. For example, a network address may be associated with a service level agreement, an exclusive or premium service, or a tiered service level. The network address block treatment server may thus identify a special treatment that makes more resources available to the network address. In other embodiments, the network address block treatment server may identify a special treatment that consumes additional resources rather than mitigating resource consumption. For example, the network address block treatment server may apply a treatment that logs or traces the activities of a network address, or may redirect requests from the network address to a dedicated server that isolates and monitors network activity (sometimes referred to as a "honeypot").

As the volume of network activity increases, the identification and application of special treatments for network addresses becomes a drain on resources in and of itself. A network address block treatment server may reduce this resource drain by identifying blocks of network addresses, determining that the block meets specified criteria, and determining that a treatment should be applied to the entire block. Blocks of network addresses may be generally described as sets, groups, blocks, subnets, or other subdivisions of network addresses within a network. A network address block may be, for example, a subnet defined by a subnet mask, a set of addresses that correspond to a hash value, or an arbitrary collection of network addresses. By applying treatments to network address blocks, the network address block treatment server may reduce the time and resources required to apply treatments on a per-address basis.

The network address block treatment server may apply sophisticated criteria and other heuristics to determine that a treatment should be applied to an address block, in contrast to conventional "all or nothing" approaches that will only apply a treatment if all addresses within the block are subject to the treatment. For example, the network address block treatment server may apply criteria that assess the amount of desirable traffic (e.g., valid service requests) received from an address block that is generating high volumes of malformed requests, and may determine that the benefits of applying a treatment to the block outweigh the disadvantages of applying the treatment to the desirable traffic. As a further example, the network address block treatment server may assess the impact of an applied treatment on an address block (e.g., by comparing network activity data that is collected before and after application of the treatment) and determine based on the assessed impact that the treatment should not continue.

In some aspects of the present disclosure, a network address block treatment server may associate individual network addresses with treatments. For example, a network address block treatment server may obtain criteria for associating network addresses with treatments based on monitored network activity, as described above. The obtained criteria may specify, for example, that a network address generating more than three malformed requests within a five-minute period should be associated with a treatment that denies future requests from the network address. In some embodiments, the criteria may specify a duration for the treatment, or may specify conditions for applying the treatment. For example, the criteria may specify that a CAPTCHA treatment should be applied to a network address unless the network address has successfully responded to a CAPTCHA within the past hour. In further embodiments, the criteria may include a reputation score associated with the network address. The network address block treatment server may increase or decrease the reputation score of the network address as it identifies network activities associated with the address, and may associate or remove a treatment based on reputation score changes.

In other aspects of the present disclosure, associations between individual network addresses and treatments may be generated externally and then provided to the network address block treatment server. For example, a networked service provider may monitor its own traffic, identify computing devices that are sending high volumes of programmatically generated requests, associate the network addresses of these computing devices with a treatment, and then forward the addresses and the treatment to the network address block treatment server.

Having obtained network addresses and associated treatments, the network address block treatment server may analyze the set to associate treatments with network address blocks. Illustratively, the network address block treatment server may identify a network address block as containing one or more network addresses associated with a treatment. The network address block treatment server may then obtain criteria for applying treatments to network blocks, determine that the network address block satisfies the criteria, and apply the treatment to the entire block. For example, the network address block treatment server may obtain criteria indicating that a treatment reducing the services made available to a computing device should apply to network addresses that generate a high volume of requests. In some aspects, the network address block treatment server may directly analyze network activity data to identify address blocks that are candidates for treatment, rather than analyzing treatments that have been associated with individual network addresses. For example, the network address block treatment server may identify an address block and determine, based on network activity data, that a threshold volume of malicious requests have originated from the address block. The network address block treatment server may thus apply a treatment denying requests from the address block, without analyzing associations between treatments and individual network addresses within the address block. In further aspects, the network address block treatment server may combine individual address criteria and block criteria to determine that a treatment should be applied to an address block.

The network address block treatment server may determine a representation for the address block associated with the treatment. Illustratively, the network address block treatment server may represent the address block in a manner that reduces storage and bandwidth costs relative to storing or transmitting a list of individual network addresses. For example, the network address block treatment server may utilize Classless Inter-Domain-Routing ("CIDR") notation to represent a block of IPv4 addresses. Generally described, CIDR notation specifies an address within a subnet followed by a subnet mask, which is specified as a number of leading "1" bits. For example, the notation 10.0.5.1/24 represents the IP address 10.0.5.1 and a subnet mask that begins with 24 consecutive "1" bits. The mask thus indicates that the first 24 bits of the address (i.e., the octets 10, 0, and 5) are unchanging, but the final eight bits may vary. Accordingly, the subnet or address block represented by the notation 10.0.5.1/24 includes the addresses 10.0.5.1, 10.0.5.2, 10.0.5.3, and so on through 10.0.5.254. As a further example, the network address block treatment server may utilize CIDR notation to represent a block of addresses that use Internet Protocol version 6 ("IPv6") or another address protocol. As still further examples, the network address block treatment server may generate a hash or mask that represents a group or set of non-consecutive addresses. One skilled in the art will appreciate that the example representations provided herein are illustrative and not limiting.

In some embodiments, the network address block treatment server may further identify addresses or sub-blocks within the address block, and may associate these addresses or sub-blocks with additional treatments, separate treatments, or exceptions to treatment. For example, the network address block treatment server may associate a challenge-response treatment with the address block 10.0.7.1/23 (that is, network addresses from 10.0.7.1 to 10.0.8.254). The network address block treatment server may then identify a sub-block within the 10.0.7.1/23 block, such as 10.0.8.4/30 (10.0.8.4 through 10.0.8.7), and associate a denial treatment with the sub-block. The network address block treatment server may apply the same criteria to sub-blocks that it uses for the larger block, or it may apply different or further criteria. For example, the network address block treatment server may limit the number of sub-blocks it identifies. The network address block treatment server may specify priorities or an order of precedence when multiple treatments are applicable to a particular network address block. For example, the network address block treatment server may specify that a treatment associated with a smaller sub-block takes precedence over a treatment associated with a larger block that includes the sub-block. As a further example, the network address block treatment server may specify that a particular treatment, such as a denial treatment, has a higher priority than other treatments.

The network address block treatment server may be implemented as a service that publishes address blocks and associated treatments to network service providers, who may implement the treatments within the context of their respective services. Illustratively, a network service provider may implement only a subset of the treatments, or may substitute other treatments for the treatments identified by the network address block treatment server. A network service provider with high security requirements, for example, may implement a denial treatment for address blocks where the network address block treatment server has identified a challenge-response treatment. In other embodiments, the network address block treatment server may generate and output firewall rules, routing tables, web server redirection rules, or user interfaces for interacting with network service providers, which may be implemented directly by the network address block treatment server, by the network service providers, or by external components.

The foregoing aspects and many of the attendant advantages will become more readily appreciated as the same become better understood by reference to the following description of illustrative embodiments, when taken in conjunction with the accompanying drawings depicting the illustrative embodiments.

Figure 1B:
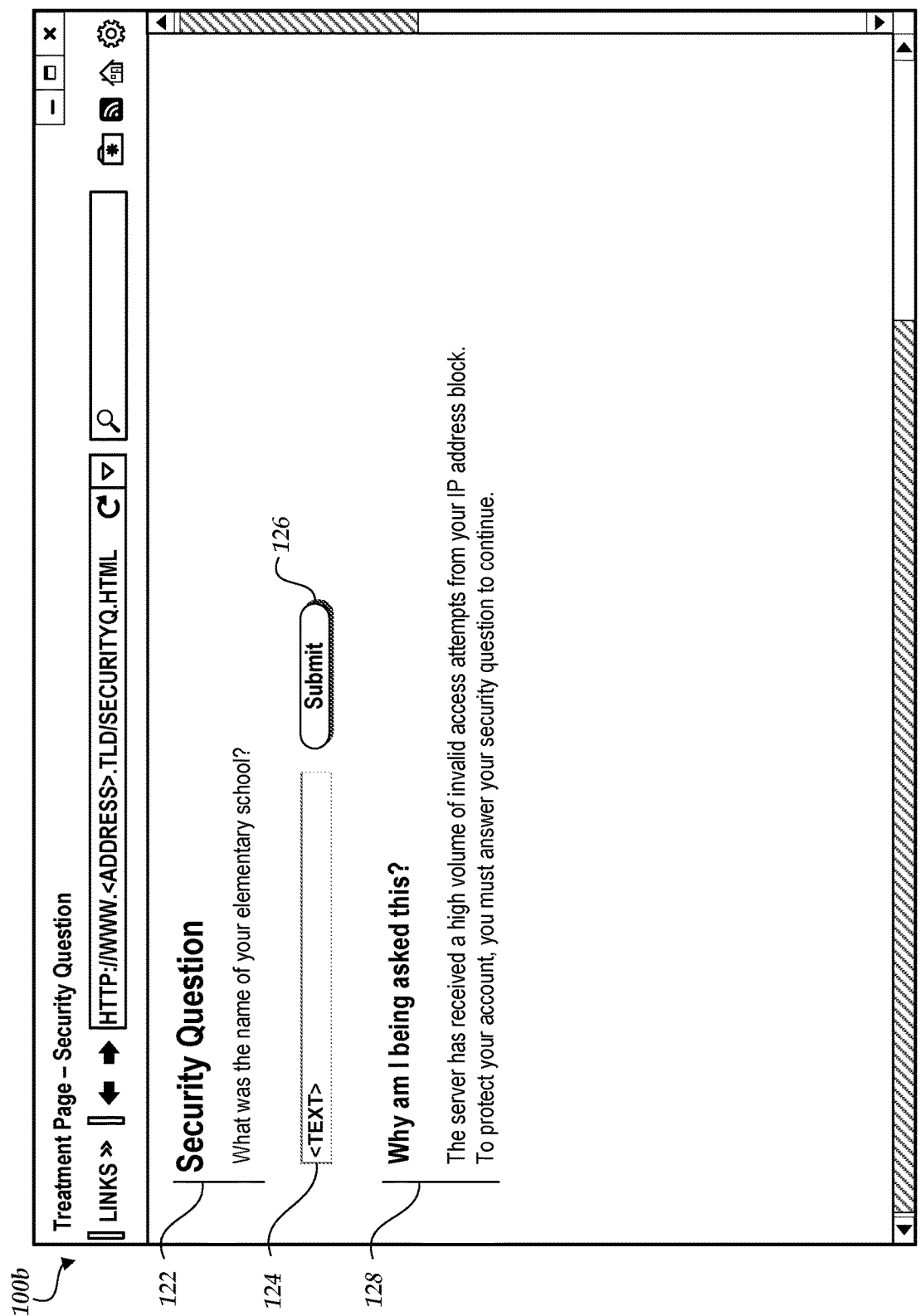

FIGS. 1A and 1B are pictorial diagrams depicting illustrative user interfaces 100a and 100b that may be generated by a server, such as the network address block treatment server 210 that is discussed in more detail below. The user interfaces 100a and 100b may be used to display a treatment of a network address block. For purposes of illustration, the user interfaces 100a and 100b may be generated for display on a computing device, such as one of the computing devices 260 discussed with reference to FIG. 2, below. The user interfaces 100a and 100b may illustratively be presented via a browser. As shown in FIG. 1A, the user interface 100a displays a treatment message 102. The treatment message 102 may be displayed, for example, in conjunction with a Hypertext Transfer Protocol ("HTTP") error code, or may be displayed as text, an image or images, sound, video, or any combination thereof. In the illustrated example, treatment message 102 indicates that a server has received too many requests from IPv4 addresses within a particular address block, which is identified using CIDR notation. The server may illustratively be the network address block treatment server 210 itself, or may be a server operated by a networked service provider 250 and configured to deliver a networked service.

With reference now to FIG. 1B, a second example user interface 100b is described that displays interactive content. User interface 100b displays a challenge-response treatment in the form of a security question 122. Illustratively, the security question may be based on information that a user provided when creating or updating an account. Input field 124 and action button 126 allow the user to provide input in response to the security question. Explanatory message 128 indicates that the challenge-response treatment has been invoked for the user's address block in response to a number of invalid attempts to access accounts that originated from network addresses within the address block. In some embodiments, challenge-response treatment may include a CAPTCHA or other test, and may be invoked in response to, for example, computer-generated requests, high volumes of requests, or other network activities. As described in more detail below, receiving a valid response to the challenge from a particular network address may cause that address to be treated as an exception, or may cause the treatment to be removed from the entire address block.

Further examples of user interfaces and corresponding treatments are within the scope of the present disclosure. For example, the special treatment interface 100 may provide access to only a subset of the services provided by the network service provider 250, or may provide an interface that reduces the scope of available services. As a further example, the network address block treatment server 210 may restrict access to a network service that provides computing resources upon request in a manner such that computing devices within a restricted block are only allowed to request a limited quantity of resources.

Figure 2:
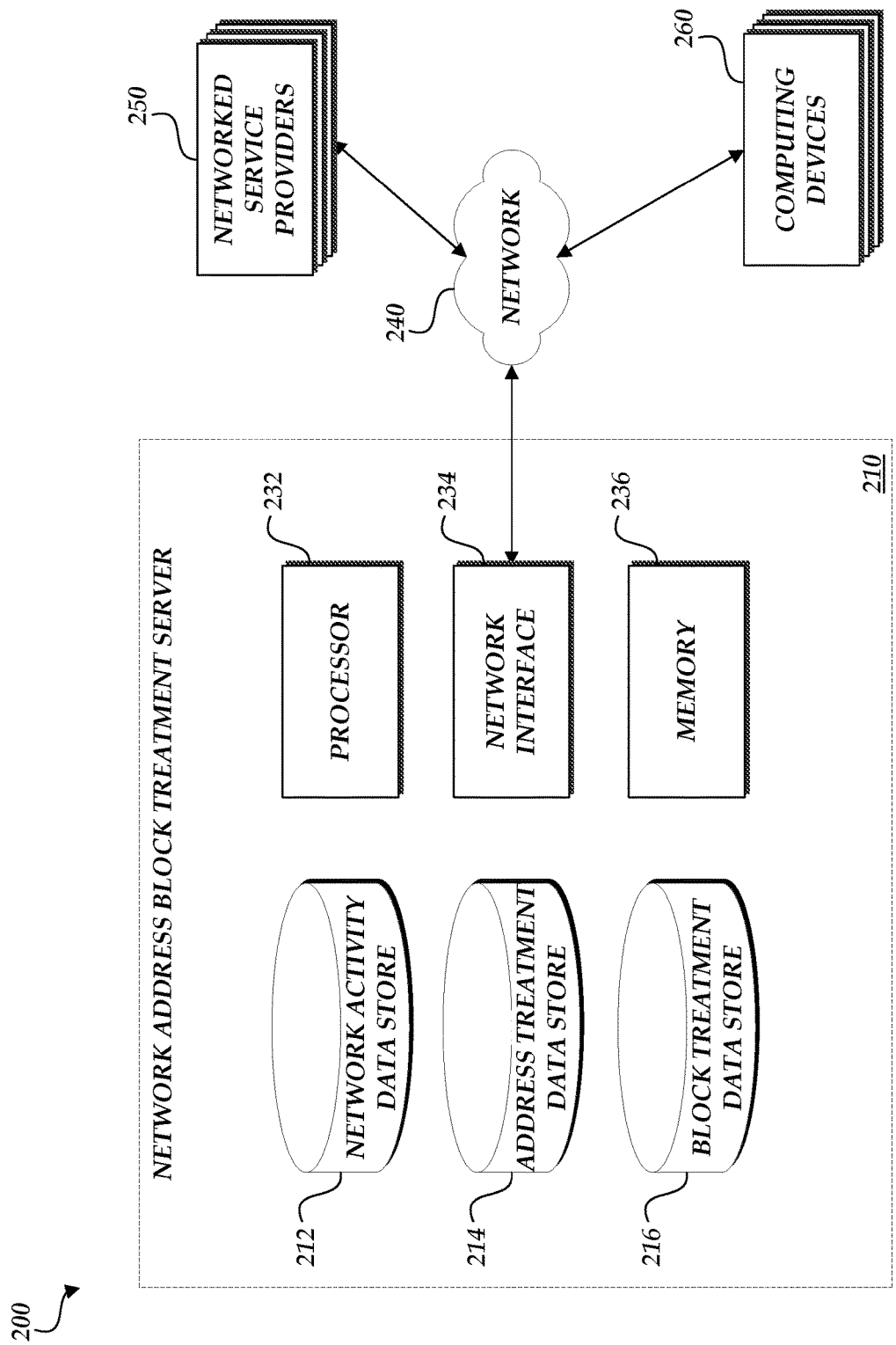
FIG. 2 is a schematic block diagram of an illustrative network topology including computing devices, networked service providers, and a network address block treatment server interconnected via a network.

FIG. 2 is a schematic block diagram of an illustrative operating environment 200 including one or more computing devices 260 in communication with a network address block treatment server 210 and one or more networked service providers 250 via a network 240. The computing devices 260 may have one or more processors, input/output devices, network interfaces, memories, storage devices, or communication buses (not depicted in FIG. 2), and may provide connectivity to and from one or more networks, including network 240. In one embodiment, a computing device 260 may contain and may execute computer-readable instructions that cause the one or more processors to implement a browser. Examples of computing devices 260 include, but are not limited to, laptops, personal computers, personal digital assistants (PDAs), hybrid PDA/mobile phones, mobile phones, electronic book readers, global positioning system (GPS) devices, cameras, audiobook players, digital media players, wearable computing devices, integrated components for inclusion in computing devices, appliances, electronic devices for inclusion in vehicles or machinery, gaming devices, set top boxes, electronic devices for inclusion in televisions, and the like.

The illustrative operating environment 200 further includes a network 240 operable to enable communication between the computing devices 260, the network address block treatment server 210, and the networked service providers 250. The network 240 may be any wired network, wireless network, or combination thereof. In addition, the network 240 may be a personal area network, local area network, wide area network, cable network, satellite network, cellular telephone network, or combination thereof. In further addition, the network 240 may be an over-the-air broadcast network (e.g., for radio or television) or a publicly accessible network of linked networks, possibly operated by various distinct parties, such as the Internet. In some embodiments, the network 240 may be a private or semiprivate network, such as a corporate or university intranet. The network 240 may include one or more wireless networks, such as a Global System for Mobile Communications (GSM) network, a Code Division Multiple Access (CDMA) network, a Long Term Evolution (LTE) network, or any other type of wireless network. The network 240 can use protocols and components for communicating via the Internet or any of the other aforementioned types of networks. Protocols and components for communicating via the Internet or any of the other aforementioned types of communication networks are well known to those skilled in the art of computer communications and thus need not be described in more detail herein.

The illustrative operating environment 200 may further include a network address block treatment server 210. As illustrated in FIG. 2, the network address block treatment server 210 includes an arrangement of computer hardware and software components configured to implement aspects of the present disclosure. The network address block treatment server 210 may include more (or fewer) components than those shown in FIG. 2. As illustrated, the network address block treatment server 210 includes a processor 232, a network interface 234, a memory 236, a network activity data store 212, an address treatment data store 214, and a block treatment data store 216, all of which may communicate with one another by way of a communication bus (not shown in FIG. 2). The network interface 234 may provide connectivity to one or more networks or computing systems. The processor 232 may thus receive information and instructions from other computing systems or services via a network. Illustratively, the processor 232 may utilize the network interface 234 to access external data stores or servers and obtain network activity data, network address treatment data, or network address block treatment data in addition to, or in place of, information contained in data stores internal to the network address block treatment server 210.

The illustrative, non-transitory memory 236 of FIG. 2 includes computer executable instructions that the processor 232 executes in order to implement one or more embodiments of the present disclosure. The memory 236 can include any combination of transitory or non-transitory memory, including RAM, ROM, hard disk drives, solid state drives, flash memory, etc. The memory 236 may store an operating system that provides computer program instructions for use by the processor 232 in the administration and operation of the network address block treatment server 210. Examples of operating systems for servers are well known in the art and therefore will not be described in further detail herein. The memory 236 may further include computer program instructions and other information for implementing aspects of the present disclosure. For example, in one embodiment, the memory 236 includes instructions for implementing a network address block treatment routine 600, as described in more detail with regard to FIG. 6. As will be appreciated by one skilled in the art, the memory 236 may contain instructions that cause the processor 232 to store and retrieve content from the network activity data store 212, the address treatment data store 214, and the block treatment data store 216.

In the illustrated embodiment, network activity data store 212, address treatment data store 214, and block treatment data store 216 are data stores containing network activity data, network address treatment data, and network address block treatment data respectively. The data stores 212, 214, and 216 may correspond to any non-transitory, persistent or substantially persistent storage media, such as one or more hard disk drives (HDDs), solid state drives (SSDs), or network attached storage devices (NASs). In various embodiments within the scope of the present disclosure, data stores 212, 214, and 216 may be combined into a single data store, distributed across multiple data stores, and/or may be external to the network address block treatment server 210.

While the network address block treatment server 210 of FIG. 2 is described herein with reference to a single processor 232, network interface 234, and memory 236, embodiments of the present disclosure can further include additional processors, network interfaces, and memories acting in concert to implement functionalities of the network address block treatment server 210. Thus, embodiments of the present application may be implemented by any number of computing devices in communication with one another.

Figure 3:
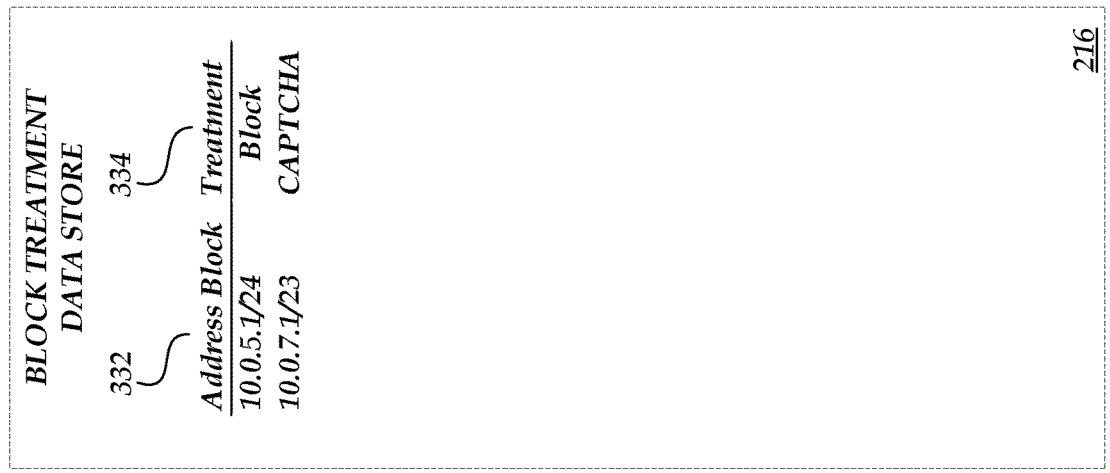
FIG. 3 is a block diagram depicting illustrative network activities, network address treatments, and network address block treatments that are monitored, generated, and utilized by a network address block treatment server.
Figure 3:
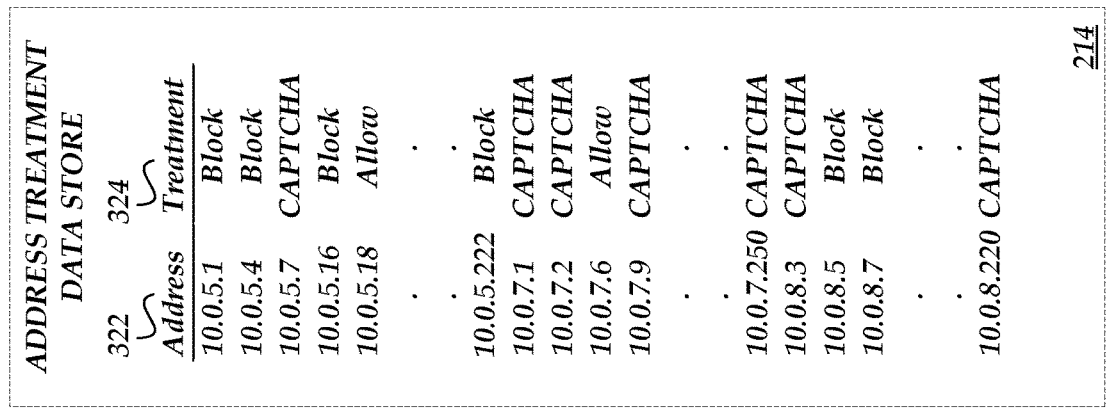
Figure 3:
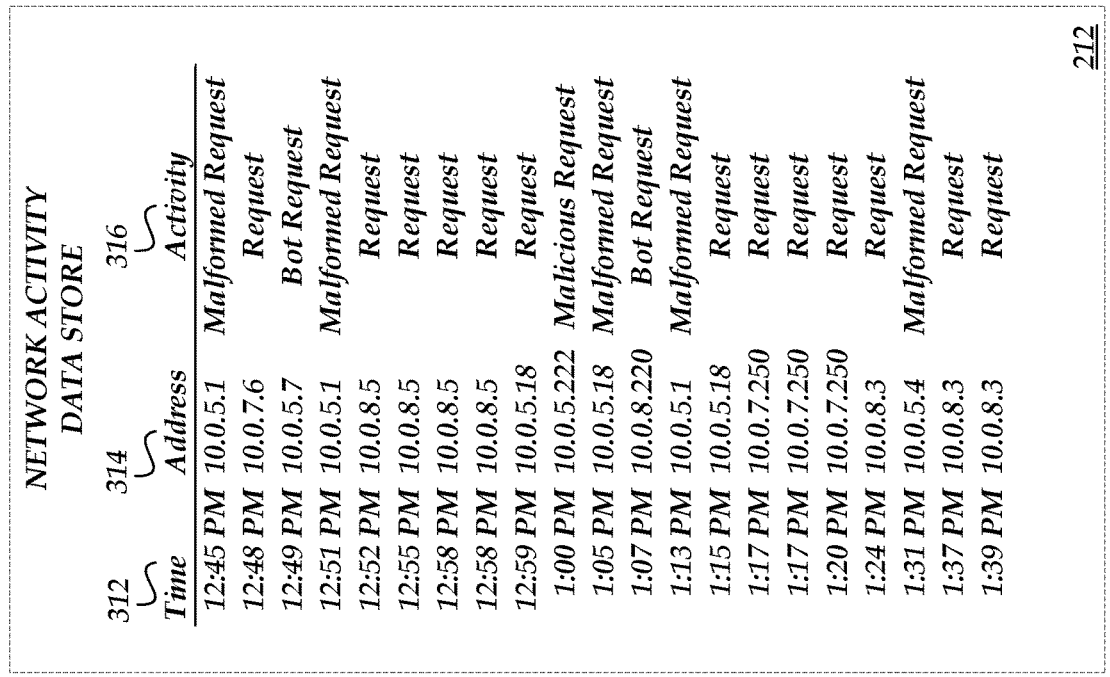

FIG. 3 is a block diagram depicting illustrative network activities, network address treatments, and network address block treatments, which may be stored in data stores such as the network activity data store 212, address treatment data store 214, and block treatment data store 216 of FIG. 2. One skilled in the art will understand that FIG. 3 depicts a greatly simplified subset of the information that may be captured, monitored, generated, and utilized by aspects of the present disclosure, and that the data stores 212, 214, and 216 may contain more information or less information than depicted in the illustration.

In the illustrated diagram, the network activity data store 212 contains network activity data such as timestamps 312, source addresses 314, and activities 316. In some embodiments, the network address block treatment server 210 may obtain network activity data from networked service providers 250, and may store such data in the network activity data store 212. In other embodiments, the network address block treatment server 210 may obtain network activity data by directly monitoring network 140, or may obtain the data from firewalls, routers, network logs, or other sources of network activity information. Further, in some embodiments, the network address block treatment server 210 may characterize the network activity data. As a non-limiting example, the network address block treatment server 210 may analyze timestamps to detect that requests from a particular source address are being generated programmatically, e.g., by detecting a pattern in the request's content or frequency. As further non-limiting examples, the network address block treatment server 210 may parse requests to identify malformed requests, may compare requests to a database of known malicious requests (e.g., requests that attempt to exploit a known security flaw), or may identify multiple requests originating from a particular source address within a specified timeframe.

The address treatment data store 214 may illustratively store a set of network addresses 322 and corresponding treatments 324. In an embodiment, the network address block treatment server 210 may analyze the network activity data to determine treatments for particular network addresses, and may store these results in the address treatment data store 214. For example, the network activity data indicates that IP address 10.0.5.1 issued malformed requests at 12:45 p.m., 12:51 p.m., and 1:13 p.m., and did not issue any properly formatted requests during the timeframe in question. Accordingly, the network address block treatment server 210 may determine that further service requests from 10.0.5.1 should be denied in order to prevent the computing device at address 10.0.5.1 from needlessly consuming server resources with requests that cannot be processed. As a further example, the network address block treatment server 210 may analyze the network activity associated with IP address 10.0.8.220, determine that the only recent activity was a programmatically generated request, and may determine that a CAPTCHA treatment should be associated with the IP address. As a still further example, the block treatment server 210 may determine that IP addresses 10.0.7.250 and 10.0.8.5 generated high volumes of requests within short time periods, and may determine appropriate treatments. As discussed in more detail below, the network address block treatment server 210 may apply various criteria to determine the treatment for a particular network address. Additionally, in some embodiments, the treatments for individual network addresses may be determined externally, and may be provided instead as an input to the network address block treatment server 210.

The block treatment data store 216 may illustratively store a set of network address blocks 332 and corresponding treatments 334. In the illustrated embodiment, network address blocks are stored in CIDR notation. For example, the notation 10.0.5.1/24 represents the block containing addresses 10.0.5.1, 10.0.5.2, 10.0.5.3, and so on through 10.0.5.254. As a further example, the notation 10.0.7.1/23 represents the block containing addresses 10.0.7.1 through 10.0.8.254. As described in detail below, the network address block treatment server 210 may identify network address blocks and corresponding treatments by analyzing address treatments and applying various criteria, or in some embodiments by analyzing network activity. In FIG. 3, the network address block treatment server 210 has determined that addresses in the 10.0.5.1/24 block should receive denial treatment and that addresses in the 10.0.7.1/23 block should receive CAPTCHA treatment. The network address block treatment server 210 has also stored these address blocks and treatments in the block treatment data store 216.

Although the illustrated embodiment uses IPv4 addresses and CIDR notation, one skilled in the art will appreciate that the present disclosure is not limited to any particular address protocol, notation, or representation. For example, in some embodiments, IPv6 addresses may be used. In further embodiments, blocks or other groups of network addresses may be represented and stored using hash values, bitmasks, or other compact representations. For example, the bitmask 10.0.10.1/255.255.255.1 may be used to represent odd-numbered IPv4 addresses from 10.0.10.1 to 10.0.10.253. The examples depicted are thus understood to be illustrative and not limiting.

Figure 4:
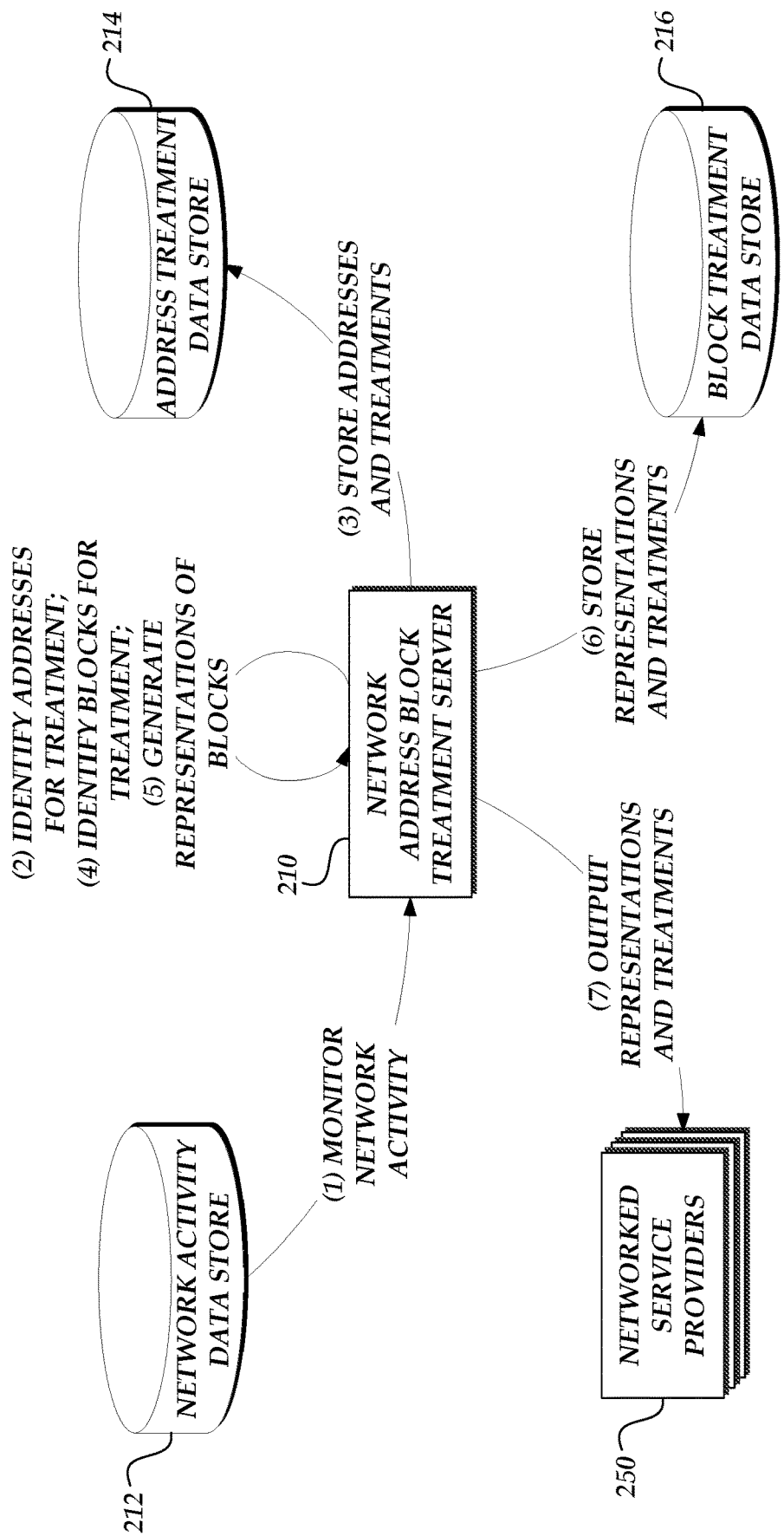
FIG. 4 is a block diagram depicting an illustrative determination of network address block treatments by a network address block treatment server.

FIG. 4 is a block diagram of the network topology of FIG. 2 illustrating the determination of network address block treatments. At (1), the network address block treatment server 210 obtains network activity data. Illustratively, the network address block treatment server 210 may obtain network activity data from a data store, such as the network activity data store 212. In various embodiments, the network address block treatment server 210 may obtain data from server or firewall logs, by requesting activity data from networked service providers 250, or by monitoring network activity directly. In some embodiments, the network address block treatment server 210 may implement, or may be implemented as part of, a firewall or router that manages network traffic for the networked service providers 250.

At (2), the network address block treatment server 210 may identify network activities that call for special treatment of the associated network addresses. For example, as described above, the network address block treatment server 210 may identify network addresses that are generating malformed requests, malicious requests, an excessive number of requests within a specified time period, programmatically generated requests, or other identifiable activities or patterns of activity. The network address block treatment server 210 may illustratively implement a routine, such as the network address treatment routine 500 described below with reference to FIG. 5, to identify network addresses in need of special treatment and to associate corresponding treatments with the network addresses in question. At (3), the identified network addresses and corresponding treatments may be stored in a data store, such as the address treatment data store 214.

In various embodiments, some or all of the interactions at (1), (2), and (3) may be carried out externally to the network address block treatment server 210, and the network address block treatment server 210 may instead obtain the results of these interactions. For example, networked service providers 250 may identify problematic network addresses and pass them to the network address block treatment server 210 with a request to identify a suitable treatment. As further examples, networked service providers 250 may determine treatments for particular addresses and store lists of addresses and corresponding treatments in the address treatment data store 214, or the network address block treatment server 210 may obtain address treatment data directly from networked service providers 250 rather than retrieving them from a data store.

At (4), the network address block treatment server 210 may identify address blocks to associate with a treatment. Illustratively, the network address block treatment server 210 may implement a routine to determine address block treatments, such as the network address block treatment routine 600 described below with reference to FIG. 6. For example, the network address block treatment server 210 may determine that a threshold number of network addresses within a subnet have been associated with a particular treatment, and accordingly may associate the entire subnet with the treatment. At (5), the network address block treatment server 210 may generate representations of the identified address blocks. Representations may illustratively identify the network addresses in the block using a compact notation, such as CIDR notation or a hash value, that reduces the storage and bandwidth requirements for managing addresses and treatments. At (6), the network address block treatment server 210 may optionally store address representations and associated treatments in a data store, such as the block treatment data store 216.

At (7), the network address block treatment server 210 may output address representations and corresponding treatments. Illustratively, address representations and treatments may be output to networked service providers 250, who may implement the treatments. In embodiments where the network address block treatment server 210 implements firewall or routing services, the network address block treatment server 210 may implement the treatments itself, in which case the interaction at (6) may be omitted. In other embodiments, the network address block treatment server 210 may output representations and treatments to firewalls, routers, or other components (not depicted in FIG. 4) for implementation.

In some embodiments, the network address block treatment server 210 may associate additional information with the address blocks and treatments. For example, the network address block treatment server 210 may associate a duration with a particular address block and treatment, and may determine that, e.g., requests from the 10.0.7.1/23 block should be given CAPTCHA treatment for one hour. In further embodiments, the network address block treatment server 210 may periodically reevaluate network activity from addresses within a treated block, and may determine based on recent network activity that the treatment should not continue. For example, the network address block treatment server 210 may determine, based on network activity data collected while the denial treatment is in effect, that addresses in the 10.0.5.1/24 range have stopped sending malformed requests, and accordingly that the denial treatment for that block should be lifted. As a further example, the network address block treatment server 210 may determine that the number of "good" requests from a block has increased, and thus block no longer meets or satisfies the criteria for applying a particular treatment.

Figure 5:
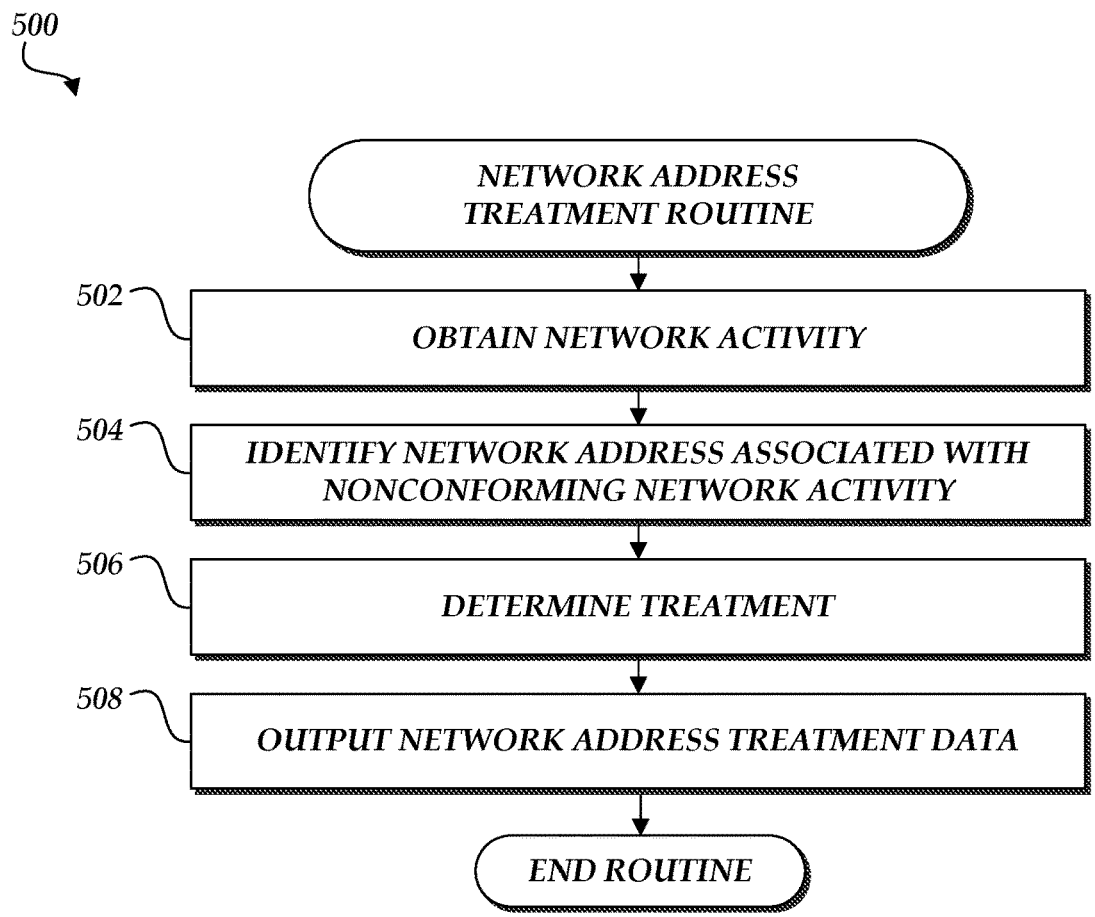
FIG. 5 is a flow diagram depicting an illustrative network address treatment routine implemented by a network address block treatment server.

With reference now to FIG. 5, one example of a network address treatment routine 500 will be described. The routine 500 may be carried out, for example, by the network address block treatment server 210 of FIG. 2. The routine 500 begins at block 502, where network activity data may be obtained. In various embodiments, as discussed above, network activity data may be obtained from a data store, such as the network activity data store 212 of FIG. 2, from networked service providers 250, from activity logs, or may be generated directly by the network address block treatment server 210.

At block 504, network activity associated with a network address may be identified. The network activity may illustratively be identified by applying criteria to the network activity data. As non-limiting examples, the identified network activity may be a threshold number of malformed requests within a specified time period, a high volume of requests relative to other network addresses, a malicious request, or a programmatically generated request. As described above, a request may be identified as a malicious request, for example, by comparing the request to other requests that are known to be malicious. A request may be identified as programmatically generated based on characteristics of the request, such as its timing or content.

At block 506, a treatment may be determined for the network address that is associated with the network activity identified at block 504. Illustratively, the treatment may be determined based on the network activity. For example, a CAPTCHA treatment may be determined in response to programmatically generated network activity, or a denial treatment may be determined in response to malformed requests. In some embodiments, criteria may be applied to determine, for example, that a CAPTCHA treatment should be identified if five to ten requests are received within a specified time period, but a denial treatment should be identified if more than ten requests are received within the time period.

At block 508, network addresses and corresponding treatments may be output. Illustratively, addresses and treatments may be output to a data store, such as the address treatment data store 214 of FIG. 2. In some embodiments, the output at block 508 may be provided as input to another routine, such as the address block treatment routine 600 described below.

As described above, in some embodiments, all or some of the blocks of routine 500 may be carried out externally from the network address block treatment server 210. For example, blocks 502 and 504 may be carried out by network service providers 250, and the results provided as input to block 506. In other embodiments, blocks of routine 500 may be carried out by an address block treatment routine 600.

In various embodiments, routine 500 may be carried out iteratively. Illustratively, iterations of routine 500 may be carried out with regard to different sets of network activity data. For example, in a later iteration of routine 500, network activity occurring in a subsequent timeframe may be obtained at block 502, and a different set of network addresses and treatments may be identified at blocks 504 and 506. Additionally, in some embodiments, a different set of criteria may be utilized with regard to continuing an existing treatment. For example, a previous iteration of routine 500 may have identified programmatically generated requests originating from a particular network address, and then associated a CAPTCHA treatment with the address. Subsequent iterations of routine 500 may obtain network activity that does not include any programmatically generated requests, but may determine that the CAPTCHA treatment should continue to be associated with the network address until a valid response to the CAPTCHA has been received.

Figure 6:
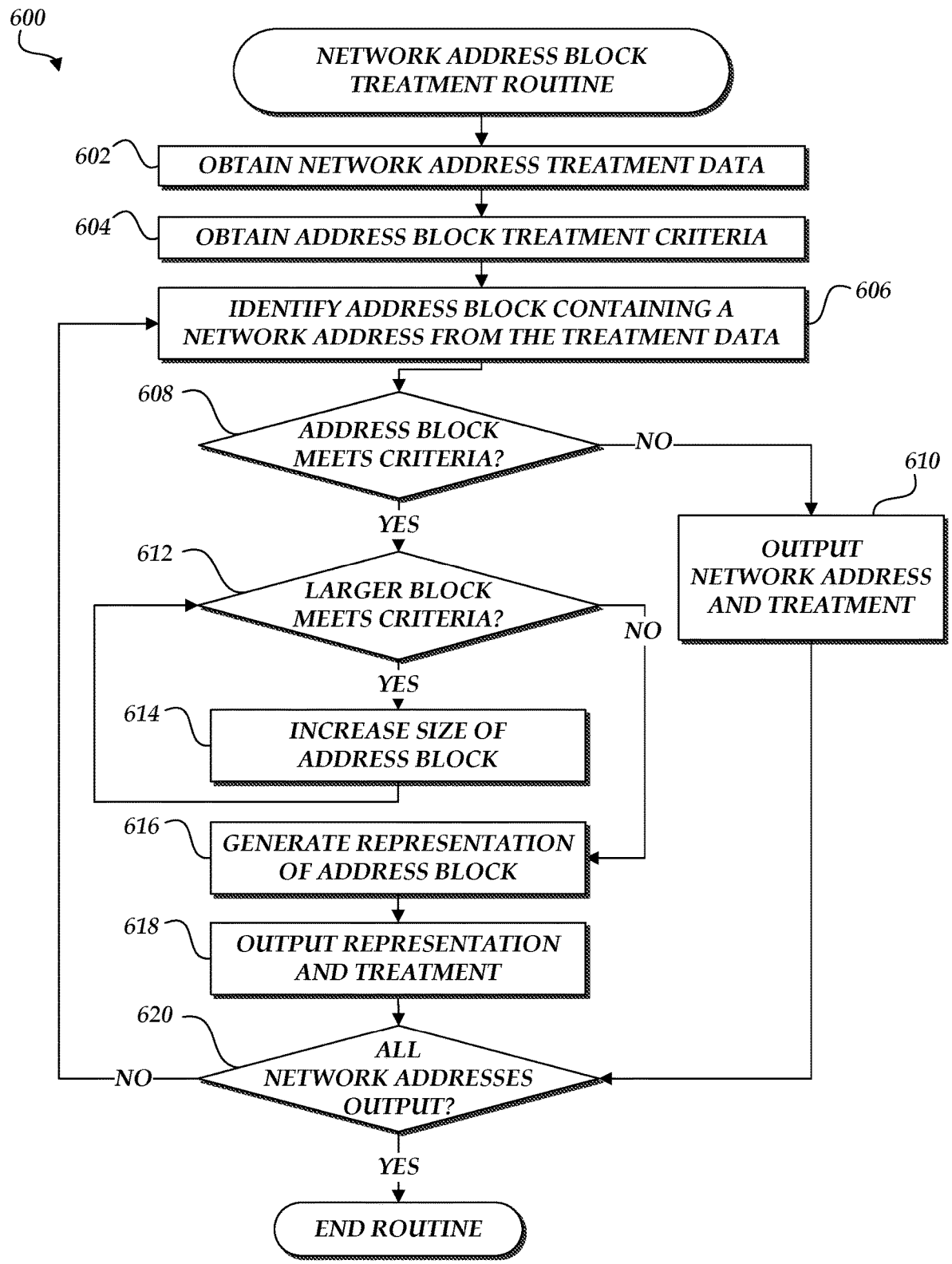
FIG. 6 is a flow diagram depicting an illustrative network address block treatment routine implemented by a network address block treatment server.

With reference now to FIG. 6, one example of a network address block treatment routine 600 will be described. The routine 600 may be carried out, for example, by the network address block treatment server 210 of FIG. 2. At block 602, a set of network addresses and corresponding treatments may be obtained. In some embodiments, network addresses and treatments may be obtained from a data store, such as the address treatment data store 214 of FIG. 2. In other embodiments, as described above, network addresses and treatments may be obtained from network service providers 250, may be generated by the network address block treatment server 210, or may be obtained from external sources.

At block 604, address block treatment criteria may be obtained. Illustratively, the address block treatment criteria may specify rules or conditions for associating a treatment with an address block. For example, the criteria may specify that at least ten percent of the network addresses in a block are associated with a particular treatment in order for that treatment to be applied to the entire block. Criteria may be based on treatments associated with individual network addresses, on network activities associated with individual network addresses, or with network activities associated with the address block. For example, the criteria may specify that a denial treatment should be associated with an address block that generates more than a threshold number of requests in a specified time period, regardless of the number of requests generated by any individual network address. Alternatively, in some embodiments, the criteria may combine individual and block rules. For example, the criteria may specify that a CAPTCHA treatment should be associated with a block when more than a tenth of the block's network activity is programmatically generated, but not if a single network address within the block is associated with more than five percent of the block's programmatically generated network activity. Various other combinations and criteria are within the scope of the present disclosure.

At block 606, a network address block may be identified that includes at least one of the network addresses obtained at block 602. Illustratively, a network address block may be generated based on a network address. For example, network address 10.0.5.4 may be obtained, and may be associated with a denial treatment. The address block 10.0.5.1/24 may thus be identified. Alternatively, in some embodiments, an address block such as 10.0.5.1/28 or 10.0.5.4/31 may be identified. The size of the identified address block may be determined, for example, based on an analysis of efficiency gains (e.g., reduction in list size) associated with various block sizes. In further embodiments, the address block identified at block 606 is the smallest sized block above a minimum size threshold.

At decision block 608, a determination is made regarding the identified address block and the treatment criteria. If the address block does not satisfy the treatment criteria, then at block 610 the network address and its treatment are output, and the routine 600 proceeds to block 620. The output of routine 600 may thus include both address blocks and individual network addresses, along with their associated treatments.

If the address block identified at block 606 does satisfy the treatment criteria, then at decision block 612 a determination is made with regard to a larger address block and the treatment criteria. Illustratively, the larger address block may contain the initially identified address block, and in some embodiments may double the size of the initial block. For example, the address block 10.0.7.1/24, representing network addresses starting with 10.0.7, may be identified at block 606. At decision block 612, a determination may thus be made with regard to address block 10.0.7.1/23, representing the network addresses starting with 10.0.7 or 10.0.8. If the larger block also satisfies the criteria, then at block 614 the identified address block is increased in size accordingly, and the routine 600 returns to block 612 to evaluate an even larger block (e.g., 10.0.7.1/22). If the larger block does not satisfy the treatment criteria, then the routine 600 branches to block 616, where a representation of the address block may be generated. Illustratively, the representation may be an address block in CIDR notation, such as 10.0.7.1/23 or fc00:1::/32, a hash value representing a set of addresses, an address and bitmask, or other representations.

At block 618, the representation and corresponding treatment may be output. Illustratively, as described above, the representation and corresponding treatment may be output to network service providers 250, who may implement the treatment with regard to the network addresses identified by the representation. Alternatively, in some embodiments, the treatment may be implemented by the network address block treatment server 210.

At decision block 620, a determination is made with regard to output of the network addresses obtained at block 602. If there are network addresses that have not been output, the routine 600 branches to block 606, where another address block is identified that includes at least one of the remaining network addresses. If all of the network addresses have been output, the routine ends.

In some embodiments, address blocks and associated treatments may be output by the routine 600 as they are determined. Illustratively, the address blocks and associated treatments may be updated by later iterations of routine 600, which may obtain updated network addresses and treatments. In these embodiments, the routine 600 may output that an address block is no longer associated with a treatment, may output an expiry time (e.g., that a particular address block is associated with a challenge-response treatment for 24 hours), or may otherwise indicate that special treatment of a particular address block is to cease. In other embodiments, the output of routine 600 may be buffered or compiled in such a manner as to provide a complete list of all special treatments currently in effect. Any output from a previous iteration of routine 600 may thus be discarded and replaced with the current output.

Variations on routines 500 and 600 are within the scope of the present disclosure. For example, routines 500 and 600 may be combined, such that network activity data is obtained and an address block is identified from the network activity data. The combined routine may then determine treatments for individual addresses only to the extent necessary to determine a treatment for the address block. For example, the criteria may indicate that a denial treatment should be applied to a block of 254 addresses when 100 of the addresses within the block are generating malformed requests. The combined routine may illustratively evaluate the first 170 addresses within the block, determine that 100 of them are generating malformed requests, and thus determine that evaluation of the remaining addresses is not necessary, since the criteria for applying the treatment to the block has already been met. One skilled in the art will thus appreciate that the examples depicted in FIGS. 5 and 6 are illustrative and not limiting.

Depending on the embodiment, certain elements, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or the entire signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A non-transitory computer-readable storage medium including specific computer-executable instructions that, when executed by a computing device, cause the computing device to at least:
   obtain network address treatment data associating individual network addresses with respective treatments;
   identify, based at least in part on the network address treatment data, a first plurality of network addresses, the first plurality of network addresses including at least one network address that the network address treatment data associates with a treatment;
   obtain a first criterion for evaluating any set of network addresses for potential application of a first treatment;
   evaluate the first plurality of network addresses for potential application of the first treatment, wherein evaluating the first plurality of network addresses comprises determining that the first plurality of network addresses satisfies the first criterion; and
   in response to determining that the first plurality of network addresses satisfies the first criterion:
      generate a first representation of the first plurality of network addresses; and
      cause the first treatment to be applied to a network address that corresponds to the first representation of the first plurality of network addresses.

2. The non-transitory computer-readable storage medium of claim 1, wherein the non-transitory computer-readable storage medium includes further specific computer-executable instructions that, when executed by the computing device, further cause the computing device to at least transmit the first representation and the first treatment to a network service provider, and wherein the network service provider is configured to:
   identify the first plurality of network addresses from the first representation; and
   cause the first treatment to be applied to the network address that corresponds to the first representation of the first plurality of network addresses.

3. The non-transitory computer-readable storage medium of claim 2, wherein the non-transitory computer-readable storage medium includes further specific computer-executable instructions that, when executed by the computing device, further cause the computing device to at least:
   identify a subset of the first plurality of network addresses;
   obtain a second criterion for determining that a second treatment should be applied to a set of network addresses;
   determine that the subset of the first plurality of network addresses satisfies the second criterion;
   generate a second representation of the subset of the first plurality of network addresses; and
   transmit the second representation and the second treatment to the network service provider.

4. The non-transitory computer-readable storage medium of claim 3, wherein the network service provider is configured to:
   identify the subset of the first plurality of network addresses from the second representation; and
   cause the first treatment and the second treatment to be applied to a network address that corresponds to the second representation.

5. The non-transitory computer-readable storage medium of claim 3, wherein the network service provider is configured to:
   identify the subset of the first plurality of network addresses from the second representation; and
   cause only the second treatment to be applied to a network address that corresponds to the second representation.

6. The non-transitory computer-readable storage medium of claim 1, wherein the non-transitory computer-readable storage medium includes further specific computer-executable instructions that, when executed by the computing device, further cause the computing device to at least:
   obtain network activity data associating individual network addresses with respective network activities; and
   generate the network address treatment data at least in part from the network activity data.

7. The non-transitory computer-readable storage medium of claim 1, wherein the non-transitory computer-readable storage medium includes further specific computer-executable instructions that, when executed by the computing device, further cause the computing device to at least:
   obtain service level agreement data associating individual network addresses with respective service levels; and
   generate the network address treatment data at least in part from the service level agreement data.

8. A system comprising:
   a data store configured to store network address treatment data; and
   a processor in communication with the data store, wherein the processor executes specific computer-executable instructions to perform operations including:

obtaining network address treatment data associating individual network addresses with respective treatments;

identifying, based at least in part on the network address treatment data, a first group of network addresses, the first group of network addresses including a network address that the network address treatment data associates with a first treatment;

obtaining a first criterion for evaluating any group of network addresses for potential application of the first treatment;

evaluating the first group of network addresses for potential application of the first treatment, wherein evaluating the first group of network addresses comprises determining that the first group of network addresses satisfies the first criterion; and responsive to determining that the first group of network addresses satisfies the first criterion:

generating a representation of the first group of network addresses; and causing the first treatment to be applied to at least one network address that corresponds to the representation of the first group of network addresses.

9. The system of claim 8, wherein the processor executes additional specific computer-executable instructions to perform additional operations including:

determining, based at least in part on a second criterion, that a second treatment should be associated with at least the first group of network addresses; and determining that the first treatment takes precedence over the second treatment.

10. The system of claim 9, wherein determining that the first treatment takes precedence over the second treatment is based at least in part on an order of precedence.

11. The system of claim 9, wherein determining that the first treatment takes precedence over the second treatment comprises determining that a quantity of network addresses associated with the first treatment by the first criterion is smaller than a quantity of network addresses associated with the second treatment by the second criterion.

12. The system of claim 8, wherein the processor executes additional specific computer-executable instructions to perform additional operations including:

determining, based at least in part on a second criterion, that a second treatment should be applied to a second group of network addresses, wherein the first group of network addresses includes the second group;

generating a representation of the second group of network addresses; and causing the second treatment to be applied to at least one network address that corresponds to the representation of the second group.

13. The system of claim 12, wherein the second criterion comprises a threshold quantity of previously identified groups of network addresses that are included within the first group.

14. The system of claim 8, wherein the processor executes additional specific computer-executable instructions to perform additional operations including:

obtaining network activity data that corresponds to individual network addresses in the first group of network addresses;

determining, based at least in part on the network activity data, that the first treatment should be discontinued; and causing application of the first treatment to the at least one network address to be discontinued.

15. The system of claim 14, wherein determining that the first treatment should be discontinued comprises determining that the first group of network addresses no longer satisfies the first criterion.

16. The system of claim 14, wherein the first criterion specifies a threshold reputation score, and wherein determining that the first treatment should be discontinued comprises determining an updated reputation score for the first group of network addresses based at least in part on the network activity data.

17. A computer-implemented method comprising:

under control of a computing device configured with specific computer-executable instructions, obtaining network address treatment data associating individual network addresses with respective treatments;

obtaining a first criterion for evaluating any set of network addresses for potential application of a first treatment;

evaluating the first group of network addresses for potential application of the first treatment, wherein evaluating the first group of network addresses comprises determining that the first group of network addresses satisfies the first criterion; and responsive to determining that the first group of network addresses satisfies the first criterion:

generating a representation of the first group of network addresses; and causing the first treatment to be applied to at least one network address that corresponds to the first group of network addresses.

18. The computer-implemented method of claim 17, wherein the first group of network addresses is a non-contiguous group of network addresses.

19. The computer-implemented method of claim 17 further comprising:

obtaining network activity data associated with the first treatment and the at least one network address;

determining, based at least in part on the network activity data, that the at least one network address no longer satisfies the first criterion; and causing application of the first treatment to the at least one network address to be discontinued.

20. The computer-implemented method of claim 19, wherein causing application of the first treatment to the at least one network address to be discontinued comprises causing application of the first treatment to the first group of network addresses to be discontinued.

* * * * *